(12) United States Patent
Sakai

(10) Patent No.: US 8,319,787 B2
(45) Date of Patent: Nov. 27, 2012

(54) IMAGE PROJECTION APPARATUS AND IMAGE OUTPUT APPARATUS

(75) Inventor: Mitsuo Sakai, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 1466 days.

(21) Appl. No.: 11/399,167

(22) Filed: Apr. 6, 2006

(65) Prior Publication Data

US 2006/0228020 A1 Oct. 12, 2006

(30) Foreign Application Priority Data

Apr. 12, 2005 (JP) ................................. 2005-114823

(51) Int. Cl.
*G09G 5/02* (2006.01)
(52) U.S. Cl. ......... 345/589; 345/581; 345/593; 345/619
(58) Field of Classification Search ................. 358/1.13, 358/1.9; 345/589
See application file for complete search history.

(56) References Cited

U.S. PATENT DOCUMENTS

| | | | | |
|---|---|---|---|---|
| 6,765,585 | B2* | 7/2004 | Wada ............................. | 345/589 |
| 6,819,439 | B2* | 11/2004 | Hayashi et al. ............... | 358/1.13 |
| 2002/0005855 | A1* | 1/2002 | Mehigan ........................ | 345/596 |
| 2002/0071130 | A1* | 6/2002 | Takamori ....................... | 358/1.6 |
| 2002/0118209 | A1* | 8/2002 | Hylen ............................ | 345/582 |
| 2003/0053097 | A1* | 3/2003 | Ohga et al. ..................... | 358/1.9 |
| 2003/0068094 | A1* | 4/2003 | Kimura et al. ................ | 382/274 |
| 2003/0117639 | A1* | 6/2003 | Milton et al. ................. | 358/1.13 |
| 2005/0012947 | A1* | 1/2005 | Ohkawa ......................... | 358/1.9 |
| 2005/0062985 | A1* | 3/2005 | Lammens et al. ............. | 358/1.9 |
| 2005/0122533 | A1* | 6/2005 | Nakagawa ..................... | 358/1.9 |
| 2005/0177796 | A1* | 8/2005 | Takahashi ...................... | 715/769 |

FOREIGN PATENT DOCUMENTS

| | | |
|---|---|---|
| JP | 3-278793 | 12/1991 |
| JP | 5-130640 A | 5/1993 |
| JP | 2000-298463 A | 10/2000 |
| JP | 2004-15522 A | 1/2004 |

OTHER PUBLICATIONS

Japanese Office Action dated Nov. 24, 2009 and English translation thereof issued in counterpart Japanese Application No. 2005-114823.
Japanese Office Action dated Feb. 9, 2010 and English translation thereof issued in a counterpart Japanese Application No. 2005-114823.

* cited by examiner

*Primary Examiner* — Xiao M. Wu
*Assistant Examiner* — Phi Hoang
(74) *Attorney, Agent, or Firm* — Holtz, Holtz, Goodman & Chick, PC

(57) ABSTRACT

An image projection apparatus includes an item selection unit which selects one of items to be image-adjusted, a first image generation unit which generates a plurality of images acquired by subjecting a target to be projected to image adjustment, in different adjusting levels, the image adjustment corresponding to an item selected by the item selection unit, a first image projection unit which projects said plurality of images generated by the first image generation unit, an image selection unit which selects any one of said plurality of images projected by the image projection unit, and a second image projection unit which projects an image selected by the image selection unit.

1 Claim, 7 Drawing Sheets

IMAGE PROJECTION APPARATUS AND IMAGE OUTPUT APPARATUS

CROSS-REFERENCE TO RELATED APPLICATIONS

This application is based upon and claims the benefit of priority from prior Japanese Patent Application No. 2005-114823, filed Apr. 12, 2005, the entire contents of which are incorporated herein by reference.

BACKGROUND OF THE INVENTION

1. Field of the Invention

This invention relates to an image projection apparatus with the function of adjusting color tone or brightness, such as a projector, and an image output apparatus which outputs an image to be projected by the image projection apparatus.

2. Description of the Related Art

A conventional image projection apparatus, such as a projector, is provided with the function of adjusting the color tone of an image projected according to its use environment. For example, the colors of an iconic document or a product to be introduced using projected images may differ delicately from the real thing, depending on the color of the screen or wall onto which the image is projected, lighting environment, the state of the lamp, or the like. The color adjusting function is provided to adjust the difference between these colors.

For example, there are many situations that require color adjustments so that the image projected by an image projection apparatus can be recognized in the same colors as those of the original, such as the colors of organs or blood in a medical conference, the colors of perishable food, clothes, or cars in introducing products, or the color of litmus paper in science class at school.

One known function of adjusting color tone in an image projection apparatus is to adjust an arbitrary color according to the observer's taste in color by using a color adjusting bar (for example, as disclosed in Jpn. Pat. Appln. KOKAI Publication No. 2004-15522). In the image projection apparatus disclosed in Jpn. Pat. Appln. KOKAI Publication No. 2004-15522, a previously stored reference image and the parameters of the reference image (at least one of brightness, hue, and saturation) are used to project a plurality of kinds of different color images onto a screen. Then, on the basis of the observer's visual evaluation, the observer is caused to select the one closest to the reference color image from the color images, set the color image as a reference color image, and make a fine adjustment of arbitrary colors according to the user's taste in color by using a plurality of color adjusting bars, which causes an image based on the color-adjusted image signal to be projected onto the screen.

BRIEF SUMMARY OF THE INVENTION

According to an aspect of the present invention, there is provided an image projection apparatus comprising: an item selection unit which selects one of items to be image-adjusted; a first image generation unit which generates a plurality of images acquired by subjecting a target to be projected to image adjustment, in different adjusting levels, the image adjustment corresponding to an item selected by the item selection unit; a first image projection unit which projects said plurality of images generated by the first image generation unit; an image selection unit which selects any one of said plurality of images projected by the image projection unit; and a second image projection unit which projects an image selected by the image selection unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, referring to the accompanying drawings, an embodiment of the present invention will be explained.

Figure 1:
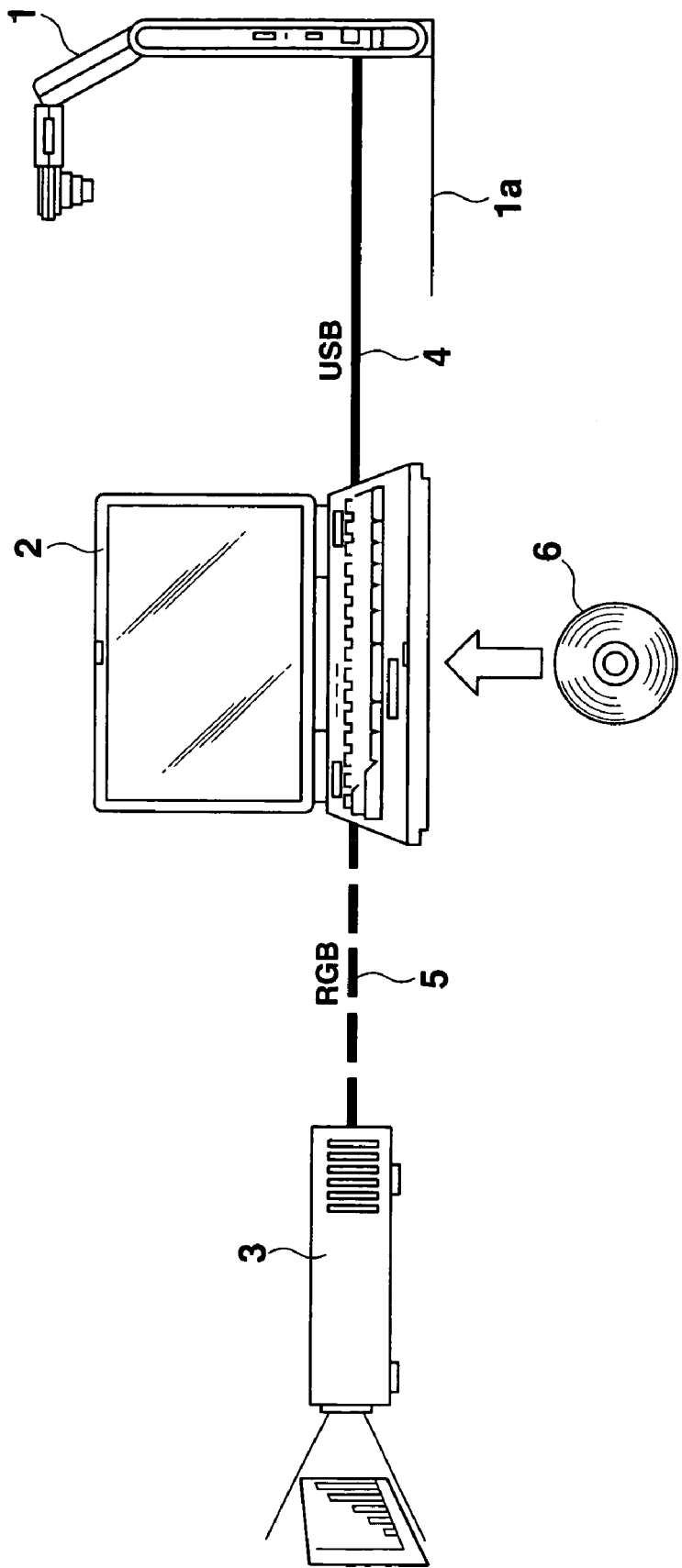
FIG. 1 shows the configuration of a system according to an embodiment of the present invention.

FIG. 1 shows the configuration of a system according to an embodiment of the present invention. FIG. 1 shows an example of applying the present invention to an image-pickup projection system composed of a calligraphic-works-and-paintings camera unit, a personal computer (PC), and a data projector unit.

In the image-pickup projection system of FIG. 1, the document camera 1 and the PC 2 are connected to each other with a Universal Serial Bus (USB) cable 4. The document camera 1 always photographs the image of a document placed on its calligraphic-works-and-paintings table 1a and sends a digital image signal via the USB cable 4 to the PC 2 in real time by isochronous transfer.

A drive program for the document camera 1 has been installed in the PC 2 through a recording medium that comes with the camera unit 1, such as a CD-ROM 6. The PC 2 executes the program, thereby generating an analog image signal corresponding to the image signal sent from the document camera 1 and sending the image signal via an RGB cable 5 to a data projector unit 3.

The data projector unit 3 forms an optical image corresponding to an image signal sent by way of, for example, a micromirror element and projects various images onto a screen serving as a projection object.

Figure 2:
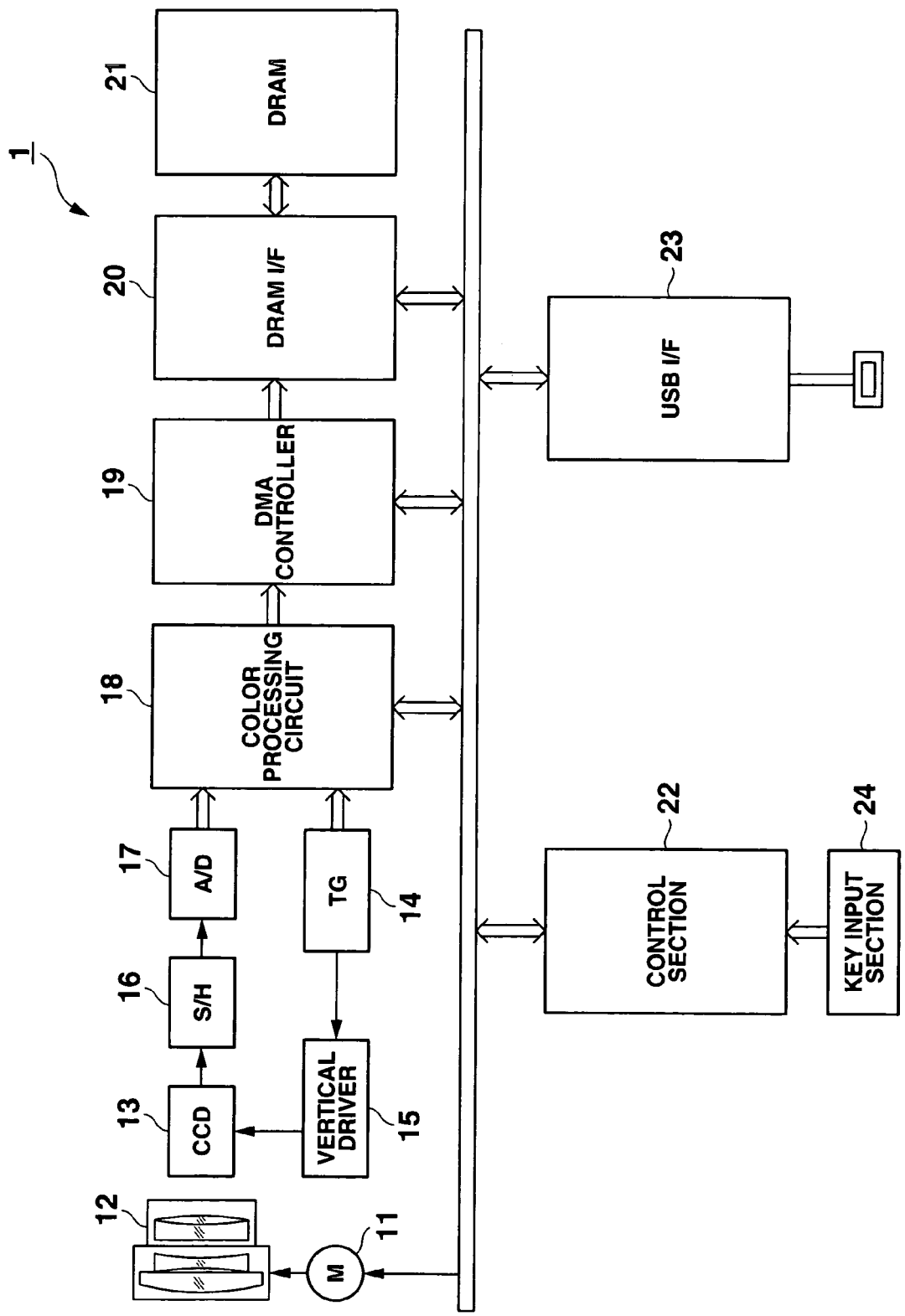
FIG. 2 is a block diagram showing the circuit configuration of a document camera 1 according to the embodiment.

FIG. 2 shows a circuit configuration of the document camera 1. In FIG. 2, a CCD 13, an image pickup device, is located in back of the photographic optical axis of a lens optical system 12 which is moved by a motor (M) 11 to a zoom angle or an aperture position in a through display mode explained later. The CCD 13 is scanned with a timing generator (TG) 14 and a vertical driver 15, thereby outputting one frame of photoelectric conversion output corresponding to the optical image formed at periodic intervals.

The photoelectric conversion output is gain-adjusted in analog signals for each of the RGB primary color components as needed. Thereafter, the gain adjusted signal is sample-held at a sample-hold (S/H) circuit 16, is converted into digital data at an analog-to-digital converter 17, and is subjected to color processing, including a pixel interpolation process and a γ correction process, at a color processing circuit 18, thereby producing a digital luminance signal Y and color difference signals Cb, Cr (YUV signals), which are then output to a direct memory access (DMA) controller 19.

The DMA controller 19 writes the luminance signal Y and color difference signals Cb, Cr output from the color processing circuit 18 temporarily into an internal buffer of the DMA controller 19 on the basis of a composite synchronizing signal, a memory write enable signal, and a clock signal from the color processing circuit 18 and DMA-transfers the signals via a DRAM interface 20 to a DRAM 21 used as a buffer memory.

The control section 22, which is composed of a CPU, a ROM that stores fixedly an operation program to be executed on the CPU, and a RAM used as a work memory, supervises the overall control operation of the document camera 1. After DMA-transferring the luminance and color difference signals to the DRAM 21, the control section 22 reads the luminance and color difference signals (YUV signals) from the DRAM 21 via the DRAM interface 20 and sends them to a USB interface 23.

The USB interface 23 sends the luminance and color difference signals via the USB cable 4 to the PC 2 in real time by isochronous transfer according to the USB standard.

When receiving a photographing instruction from the PC 2 via the USB interface 23, the control section 22 stops the DMA transfer of one frame of luminance and color difference signals taken in at that time to the DRAM 21. Then, the control section 22 scans the CCD 13 with an aperture value, a shutter speed, and a resolution that meet a new proper exposure condition, obtains one frame of luminance and color difference signals, and transfers the resulting signals to the DRAM 12.

The one frame of luminance and color difference signals transferred to the DRAM 21 is sent to the USB interface 23 via the DRAM interface 20, which sends these signals to the PC 2 again. After sending the image signals to the PC 2, the control section 22 returns to the through display state again and activates the path from the CCD 13 to the DRAM 12 again.

A key input section 24 is connected to the control section 22. A key operation signal of a power key or the like constituting the key input section 24 is input directly to the control section 22.

Figure 3:
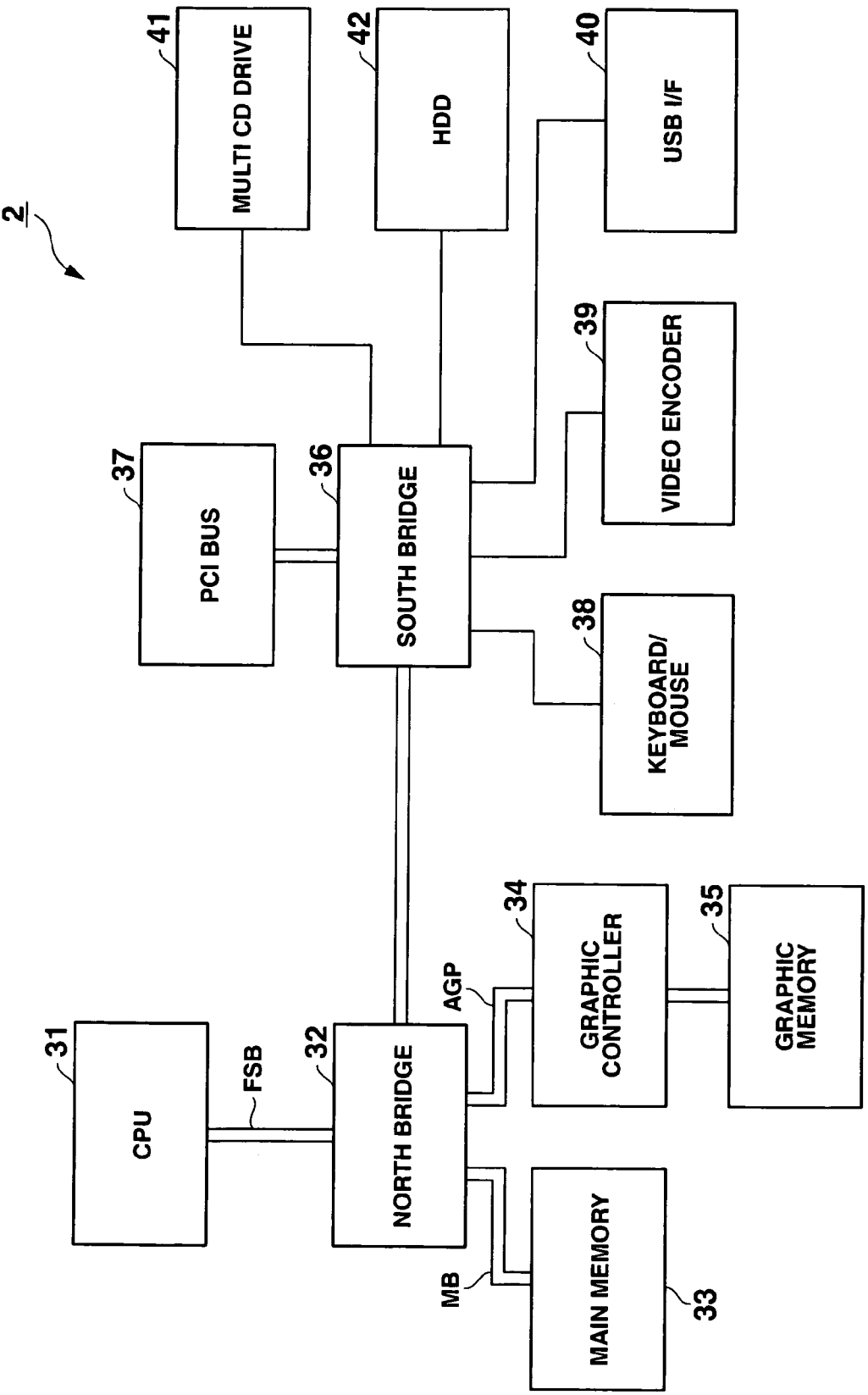
FIG. 3 is a block diagram to help explain the configuration of PC 2 in the embodiment.

Next, the configuration of the PC 2 will be explained with reference to FIG. 3. FIG. 3 shows a hardware configuration of the PC 2. In FIG. 3, a CPU 31 supervising control of various processes is connected to a north bridge 32 via a front side bus FSB.

The north bridge 32 is connected not only to a main memory 33 via a memory bus MB and to a graphic controller 34 and a graphic memory 35 via a graphic interface AGP but also to south bridge 36. The north bridge 32 performs mainly input and output control of these devices.

The south bridge 36 is connected to a PCI bus 37, a keyboard/mouse 38, a video encoder 39, a USB interface 40, a multi CD drive 41, and a hard disk drive (HDD) 42. The south bridge 36 performs chiefly control of the input and output between these peripheral circuits and the north bridge 32.

Since the individual elements constituting the PC 2 are based on very general techniques, explanation of them will be omitted.

The video encoder 39 generates an RGB video signal, an analog image signal, from a given digital image signal and outputs the RGB video signal.

The HDD 42 has stores not only an operating system (OS), various application programs, and data files but also a driver program for the document camera 1 which has been installed with the CD-ROM 6 mounted on the multi-CD drive 41.

Next, using FIG. 4, the circuit configuration of the data projector unit 3 will be explained.

Figure 4:
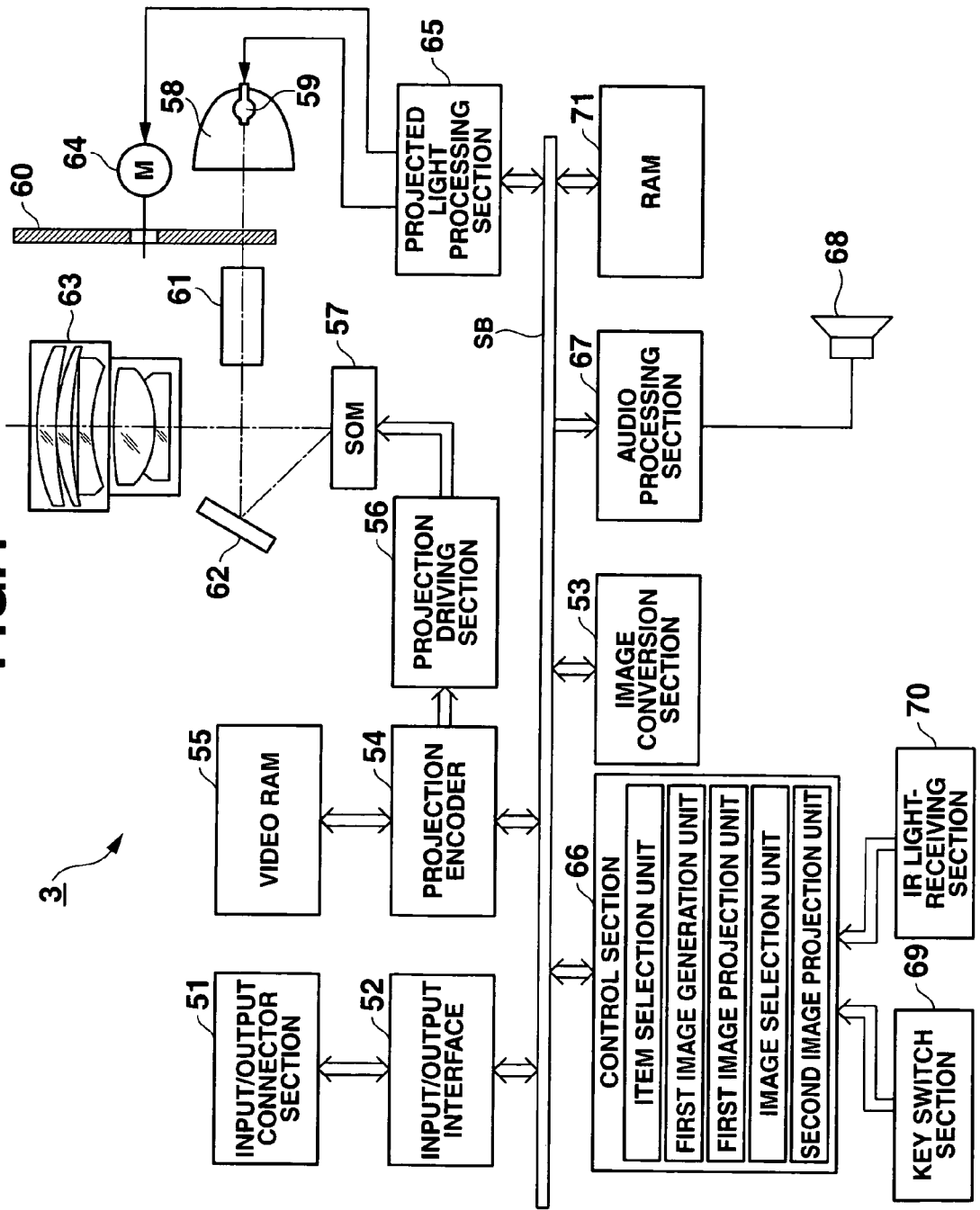
FIG. 4 is a block diagram to help explain the circuit configuration of a data projector unit 3 in the embodiment.

In FIG. 4, image signals meeting various standards, including RGB video signals, input from an input/output connector section 51 are supplied via an input/output interface 52 and a system bus SB to an image conversion section 53, which integrates the image signals into an image signal in a specific format and stores the resulting signal in a RAM 71. Moreover, the image conversion section 53 can make various image adjustments of the image signal stored in the RAM 71, including color tone and brightness adjustments, and store the adjusted image signal into the RAM 71. When a just color select function described later is executed, an image for a list of images including a plurality of images adjusted in different adjusting levels to allow the user to select a desired image adjustment is generated. The generated image is stored in the RAM 71.

The image signal stored in the RAM 71 is sent to a projection encoder 54. The projection encoder 54 develops the received image signal over a video RAM 55 and stores the resulting signal in the video RAM 55. Thereafter, the projection encoder 54 generates a video signal from the contents stored in the video RAM 55 and outputs the video signal to a projection driving section 56.

The projection driving section 56 drives spatial light modulation devices (SOM), such as a micro mirror element 57, by higher-speed time-division driving at a speed equal to the multiplication of a suitable frame rate, e.g., 120 frames/sec, the number of divisions of color components, and the number of display tones according to the received image signal.

High-intensity white light emitted from a light source lamp 59 provided in a reflector 58 is colored in primary colors via a color wheel 60 as needed. The colored light is irradiated to the micro mirror element 57 via an integrator 61 and a mirror 62, with the result that its reflected light forms an optical image. The optical image is projected on a screen (not shown) via a projection lens 63.

Both the light source lamp 59 and the motor (M) 64 rotating the color wheel 60 are operated on the basis of the supply voltage value from a projected light processing section 65.

It is the control section 66 that supervises all of the operations of the individual circuits described above. The control section 66 is composed of a CPU, a nonvolatile memory that stores an operation program to be executed on the CPU, including a projecting operation explained later and a photographing process, and a work memory. The operation program includes an image adjusting program to execute the just color select function. Moreover, image data for displaying various menus is stored. The control section 66 includes an item selection unit which selects one of items to be image-adjusted, a first image generation unit which generates a plurality of images acquired by subjecting a target to be projected to image adjustment, in different adjusting levels, the image adjustment corresponding to an item selected by the item selection unit, a first image projection unit which projects said plurality of images generated by the first image generation unit, an image selection unit which selects any one of said plurality of images projected by the image projection unit, and a second image projection unit which projects an image selected by the image selection unit.

In addition, an audio processing section 67 is connected via a system bus SB to the control section 66.

The audio processing section 67, which includes a sound source circuit, such as a PCM sound source, converts audio data supplied in the projecting operation into an analog signal, and drives a speaker 68 to amplify the sound or generates an audible beep as needed.

Furthermore, each key operation signal at the key switch section 69 provided in the data projector unit 3 is input directly to the control section 66. At the same time, the signal from an Ir receiving section 70 is also input directly to the control section 66. The Ir receiving section 70, which is provided on each of the front and back of the data projector unit 3, converts its infrared light received signal into a code signal and sends the code signal to the control section 66.

Figure 5:
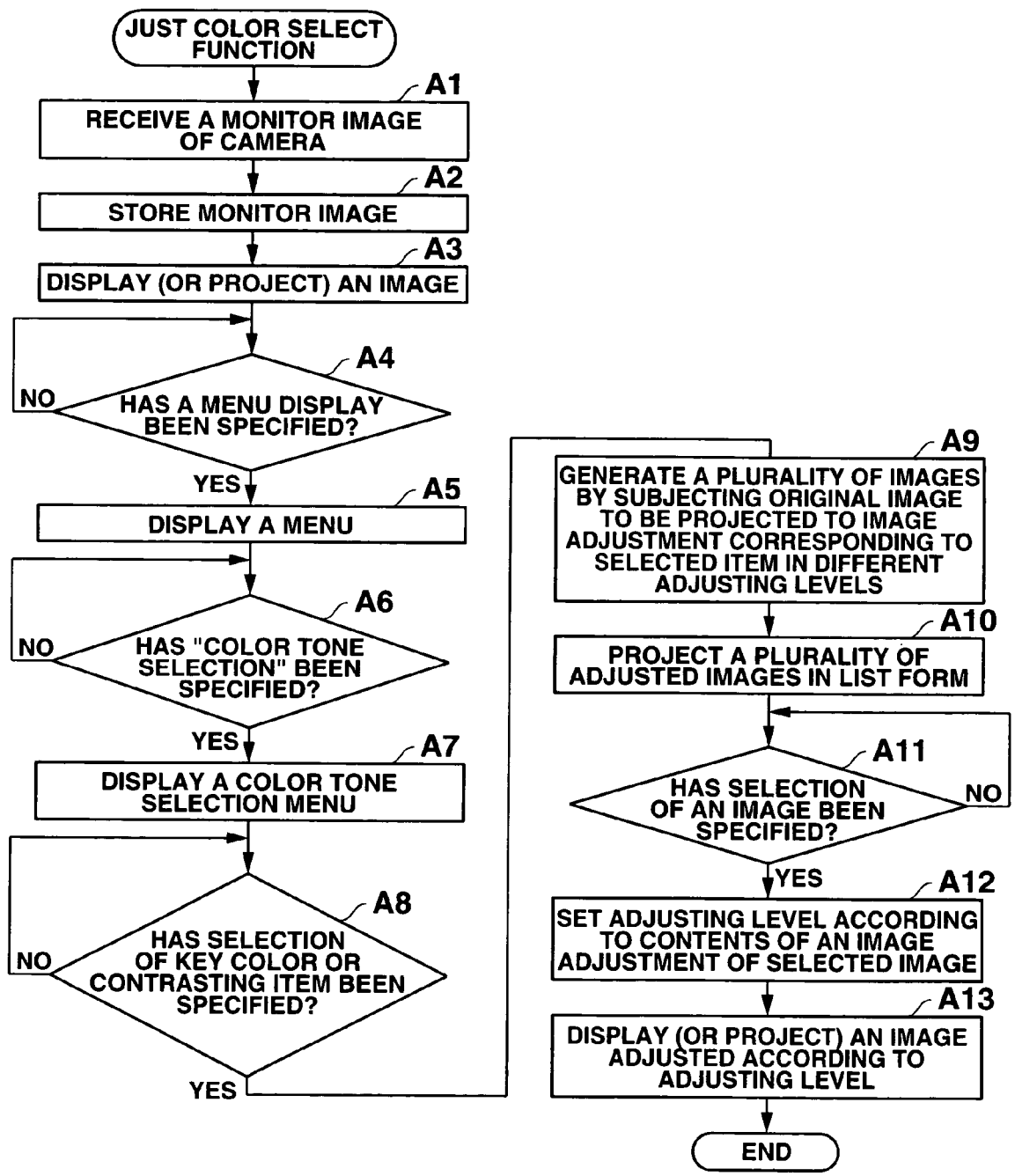
FIG. 5 is a flowchart to help explain the operation of a just color select function in the embodiment.

Next, referring to a flowchart shown in FIG. 5, the operation of the just color select function carried out at the data projector unit 3 of the embodiment will be explained.

Explanation will be given as to a case where the image of a document placed on the calligraphic-works-and-paintings table 1a is photographed with the document camera 1 and the image is transmitted via the PC 2 to the data projector unit 3, which then projects the image.

The document camera 1 continues inputting to the PC 2 an image signal of, for example, a QVGA (320 dots×240 dots) monitor image whose pixels have been thinned out at a specific frame rate, for example, 30 frames/sec. In the embodiment, the PC 2 causes the image signal input from the document camera 1 to pass through and sends the image signal to the data projector unit 3.

In the data projector unit 3, when the image signal sent from the PC 2 is input via the input/output connector section 51 (step A1), the image conversion section 53 converts the signal into an image signal in a specific format. Then, the resulting signal is stored in the RAM 71 (step A2).

In the data projector unit 3, the image signal stored in the RAM 71 is sent to the projection encoder 54, which develops the signal over the video RAM 55 and stores the result into the RAM 55. Then, on the basis of what is stored in the video RAM 55, a video signal is generated and output to the projection driving section 56.

Figure 6A:
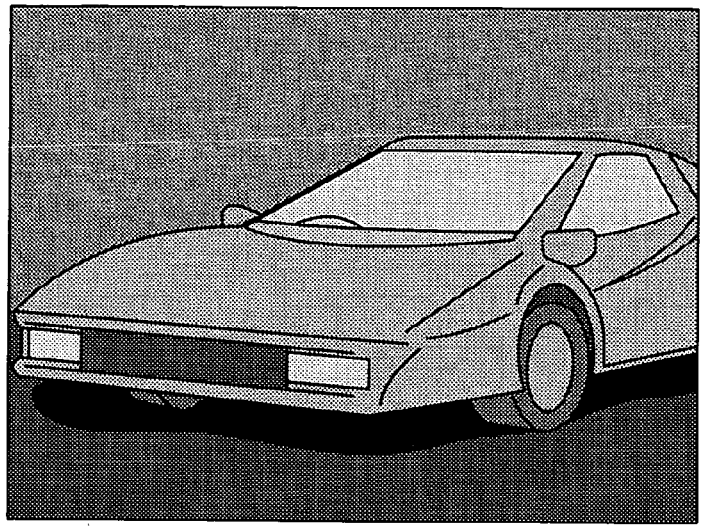
FIGS. 6A, 6B, and 6C show an example of an image projected in carrying out the just color select function in the embodiment.

The projection driving section 56 drives the micromirror element 57 at a specific frame rate in accordance with the received image signal, thereby irradiating high-intensity white light from the light-source lamp 59 via the color wheel 60, integrator 61, and mirror 62, which causes an image to be projected onto the screen via the projection lens 63 (step A3). FIG. 6A shows an example of an image projected on the screen.

Here, when a menu display is specified by operating a specific key provided in the key switch section 69 (Yes in step A4), the control section 66 causes a menu including the item "Color tone selection" for carrying out the just color select function to appear in a specific position on the projected image (step A5).

Figure 6B:
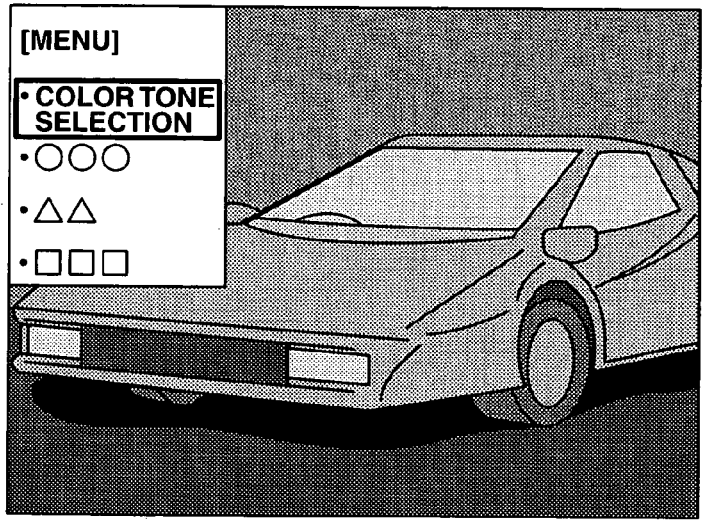

FIG. 6B shows an image of a menu superimposed on the projected image.

Here, when item "Color tone selection" is selected (Yes in step A6), the control section 66 causes a color tone selection menu for selecting the desired item for image adjustment of an image to be projected to appear in a specific position on the projected image (step A7).

Figure 6C:
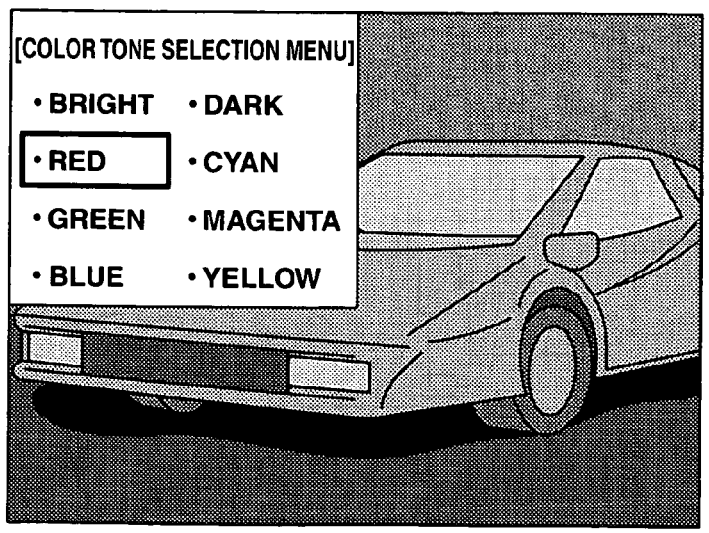

FIG. 6C shows an image of a color tone selection menu superimposed on the projected image. The color tone selection menu of FIG. 6C includes the items "Bright" and "Dark" to specify the adjustment of the brightness of the image. The menu has the following items as the key colors in color adjustment (the center of gamma curve change): red, cyan, green, magenta, blue, and yellow. The items included in the color selection menu are illustrative. Arbitrary items used for other image adjustments may be included in the menu.

Here, when the selection of the key color or the contrasting item from the color tone selection menu is specified by operating a key provided in the key switch section 69 (Yes in step A8), the control section 6 selects the specified item. Then, the control section 66 causes the image conversion section 53 to generate a plurality of images by subjecting the image to be projected to an image adjustment corresponding to the specified item in different adjusting levels (step A9).

For example, when the item for the key color is specified, a color adjustment is supposed to be made to change the gamma curve, centering on the key color. When the key color is set to a specific adjusting level for the original image to be projected, a plurality of images are generated by changing the gamma curves of other colors.

The image conversion section 53 subjects the image signal of the original image to be projected stored in the RAM 71 to an image adjusting process and at the same time, generates a plurality of reduced-size images to display in a list, and stores an image-list image signal including the plurality of images into the RAM 71.

Figure 7A:
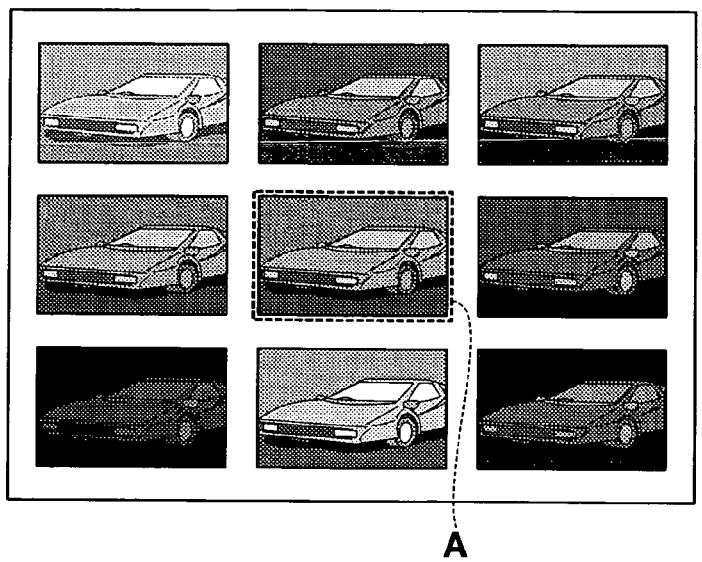
FIGS. 7A, 7B, and 7C show an example of an image projected in carrying out the just color select function in the embodiment.
Figure 7B:
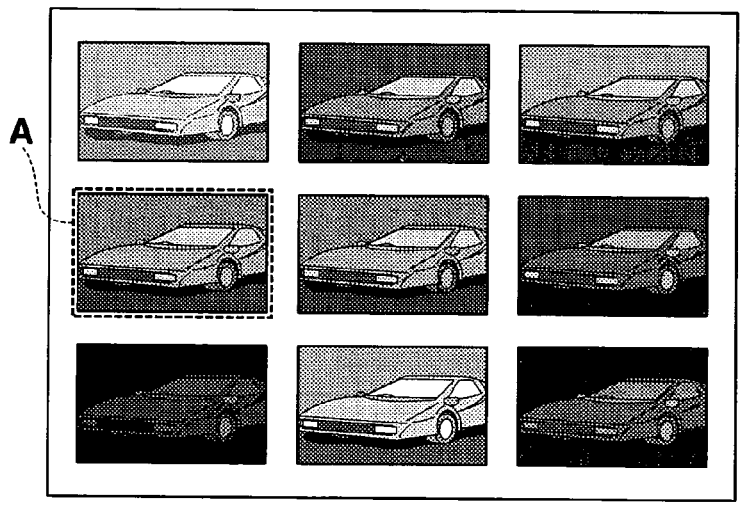
Figure 7C:
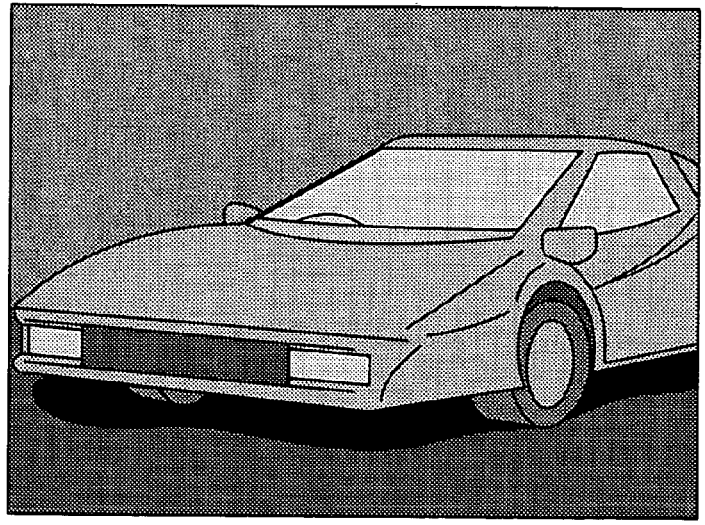

In the embodiment, when a list of images is projected, nine images are supposed to be displayed in list form (see FIGS. 7A, 7B, and 7C). Therefore, images adjusted to one-ninth the size of the original image are generated.

The control section 66 sends the image-list image signal generated by the image conversion section 53 to the projection encoder 54. The projection encoder 54 develops the received image-list image signal over the video RAM 55 and stores the result in the RAM 55. From what is stored in the video RAM 55, the projection encoder 54 generates a video signal and outputs the signal to the projection driving section 56.

The projection driving section 56 drives the micro mirror element (SOM) 57 according to the received image signal, thereby projecting a list of images on the screen (step A10).

FIG. 7A shows an example of a list display of a plurality of (9 here) images tone-adjusted in different adjusting levels. As shown in FIG. 7A, since tone-adjusted images of the original image to be projected shown in FIG. 6A are shown in the list of images, for example, an image represented in the desired colors can be recognized easily.

In the list of images, a selection frame A for selecting an image is provided. In the initial state shown in FIG. 7A, the selection frame 4 is located in the image arranged in the center. The selection frame A can be moved by operating the up, down, right, and left keys (cursor keys) provided in the key switch section 69.

When the cursor keys are operated by the user, the control section 66 moves the selection frame in the specified direction. FIG. 7B shows a state where the selection frame has been moved to the image in the middle left.

As described above, when the selection frame has been moved to the image subjected to the desired color adjustment by the user's operation and the key to specify decision is operated at the key switch section 69 (Yes in step A11), the control section 66 selects the image in which the selection frame is located and stores the contents of the image adjustment made to the selected image into a nonvolatile memory device (such as a flash memory (not shown)) (step A12).

The contents of the setting of the image adjustment stored are used when another image is projected. For instance, the contents of the setting are kept stored until the contents are reset to the default by the user or new setting is done as a result of another image being adjusted as described above. Then, the image signal input from the PC 2 is adjusted according to the contents of the setting, followed the projection of an image.

Furthermore, in order that image adjustment may be made on the basis of the contents of the previous setting according to the use environment of the image projection system (or data projector unit 3), an arbitrary name (such as a file name or a data name) may be registered in such a manner that the name corresponds to the contents of the setting of image adjustment. The name may be given automatically on the data projector unit 3 side or the user may register a name arbitrarily by operating the key switch section 69.

With the registration of names, when an image is projected under the same use environment as before, the contents of the setting of image adjustment stored at that time are read on the basis of the registered name corresponding to the contents of the setting. Therefore, there is no need to do the work of projecting a list of images and selecting the image subjected to the desired image adjustment each time as described above.

When the contents of image adjustment have been stored, the control section 66 causes the image conversion section 53 to adjust the original image to be projected according to the contents of image adjustment. As a result, the image adjusted according to the adjusting level desired by the user is projected onto the screen (step A13).

For example, when the user has specified the middle-left image in the list of images shown in FIG. 7B, the image adjustment made to the reduced images is made to the original image of FIG. 6A, which makes it possible to project an image subjected to the image adjustment desired by the user as shown in FIG. 7C.

As described above, in the data projector unit 3 of the embodiment, a plurality of images obtained by adjusting in different adjusting levels the image signal to be projected input from the PC2 according to the item to be subjected to the color tone adjustment selected by the user are projected in list form, which makes it possible to check the image adjusted to the desired color and brightness under its use environment and select the image. Since the image adjustment made to the selected image is reflected on the image to be projected, even if the user is not familiar with image adjustment, he or she can make the desire image adjustment easily.

While in the above explanation, the image taken by the document camera 1 has been projected, an image adjustment can be made in the same manner even in a case where an image processed by various application programs stored in the HDD 42 of the PC 2 is projected.

Moreover, while in the above explanation, the just color select function has been provided in the data projector unit 3, it may be provided in the document camera 1 or the PC 2.

Specifically, when the just color select function is provided in the document camera 1, an image adjustment program is stored in the control section 22. When the execution of the just color select function is specified by the user at the key input section 24, the document camera 1 processes the images photographed. In this case, the document camera 1 generates the images shown in FIGS. 7A and 7B, including a plurality of images whose adjusting levels have been changed for the items to be image-adjusted selected by the user, and sends the image signals of the images. This enables the data projector unit 3 to provide a list display of a plurality of images. From the list display of a plurality of images, any one of the images can be specified by operating the key input section 24 of the document camera 1. When any one of the images is selected according to the specification by user, the document camera 1 makes a color adjustment of the image to be output according to the color adjustment of the image and outputs the image signal of the image.

Furthermore, when the just color select function is provided in the PC 2, for example, an image adjustment program is installed in advance using the CD-ROM 6 and is stored in the HDD 42. When the execution of the just color select function is specified according to the operation of the keyboard/mouse 38 by the user, the PC2 processes the images input from the document camera 1, or the images to be projected stored in the HDD 42. In this case, the PC 21 generates the images shown in FIGS. 7A and 7B, including a plurality of images whose adjusting levels have been changed for the items to be image-adjusted selected by the user, and sends the image signals of the images. This enables the data projector unit 3 to provide a list display of a plurality of images. From the list display of a plurality of images, any one of the images can be specified by operating the keyboard/mouse 38 of the PC 2. When any one of the images is selected according to the specification by user, the PC 2 makes a color adjustment of the image to be output according to the color adjustment of the image and outputs the image signal of the image.

While in the embodiment, a plurality of images obtained by changing the gamma curve, centering on the key color, or by changing the brightness have been generated and projected in list form, other things may be used as objects to be image-adjusted. They include sharpness, contrast, color density, hue, wash drawing, and gradation. In this case, items are provided in a menu for respective image adjustments. Specifying an arbitrary item as described above causes the image to be projected to be adjusted according to the specified item in different adjusting levels, thereby producing a plurality of images, which are then projected in list form.

While in the above explanation, a plurality of images have been generated by changing the adjusting level of an image adjustment of one item selected from the menu, the user may specify a plurality of items and the image may be subjected to a combination of image adjustments for the plurality of items specified, thereby providing a list display. This makes it possible to obtain the desired adjusted image easily even when the desired image cannot be projected unless image adjustments for a plurality of items are combined.

Furthermore, while in the above explanation, a plurality of images adjusted in different adjusting levels have been projected in list form as shown in FIGS. 7A and 7B, the images to be projected may be switched one by one, for example, at regular intervals of time, or according to the specification by the user. In this case, while the image subjected to the desired image adjustment is being projected, a select specification is input, enabling the image to be selected.

Moreover, while in FIGS. 7A and 7B, the number of images in the list of images is 9, the present invention is not limited to this. The number of images to be displayed in list form may be set by the user in advance. Furthermore, the image list display may be changed, for example, at regular intervals of time or according to the specification by the user, causing more adjusted images to be projected, which enables the desired one to be selected from the projected images.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An image projection apparatus comprising:

an item selection unit which selects at least one image quality adjustment item specified by a user from a plurality of image quality adjustment items to be image-quality-adjusted;

a first image generation unit which generates a plurality of images by subjecting a target to be projected to image quality adjustment, in different adjusting levels, the image quality adjustment corresponding to the image quality adjustment item selected by the item selection unit;

a first image projection unit which projects said plurality of images generated by the first image generation unit;

an image selection unit which selects any one of said plurality of images projected by the first image projection unit; and a second image projection unit which projects an image to be projected, the to-be-projected image being subjected to the image quality adjustment carried out for the image selected by the image selection unit, wherein the image quality adjustment items to be image-quality-adjusted include a plurality of key colors on which a gamma curve change should be centered, and the first image generation unit generates a plurality of color-adjusted images differing in the adjusting level of a selected key color on which the gamma curve change should be centered, and wherein the first image generation unit performs color adjustment differing in the adjusting level of the selected key color on which the gamma curve change should be centered, and generates a plurality of images in which gamma curves of other colors have been changed, when the key color on which the gamma curve change should be centered is set to a specific adjusting level for an original image to be projected.

* * * * *